United States Patent
Takahashi

(10) Patent No.: US 9,956,624 B2
(45) Date of Patent: May 1, 2018

(54) CHAMFER MACHINING METHOD

(71) Applicants: CITIZEN WATCH CO., LTD., Tokyo (JP); CITIZEN MACHINERY CO., LTD., Nagano (JP)

(72) Inventor: Hikaru Takahashi, Nagano (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 0 days. days.

(21) Appl. No.: 14/779,323

(22) PCT Filed: Apr. 25, 2014

(86) PCT No.: PCT/JP2014/061777
§ 371 (c)(1),
(2) Date: Sep. 22, 2015

(87) PCT Pub. No.: WO2014/178355
PCT Pub. Date: Nov. 6, 2014

(65) Prior Publication Data
US 2016/0052070 A1    Feb. 25, 2016

(30) Foreign Application Priority Data
Apr. 30, 2013    (JP) ................... 2013-095927

(51) Int. Cl.
*B23C 3/12* (2006.01)
*B24B 9/00* (2006.01)
*B23C 5/10* (2006.01)

(52) U.S. Cl.
CPC .............. *B23C 3/124* (2013.01); *B23C 3/122* (2013.01); *B23C 5/10* (2013.01); *B24B 9/00* (2013.01);
(Continued)

(58) Field of Classification Search
CPC ........... B23C 3/12; B23C 3/122; B23C 3/124; B23C 3/126; B23C 2220/16;
(Continued)

(56) References Cited

U.S. PATENT DOCUMENTS 2,773,402 A * 12/1956 Edens ................... B23B 51/102
                                                      408/110
3,545,311 A * 12/1970 Messer, Jr. ............ B23B 51/102
                                                      408/113
(Continued)

FOREIGN PATENT DOCUMENTS

CN          201275649 Y       7/2009
DE          3727103 A1 *     2/1989    ............. B23B 51/10
(Continued)

OTHER PUBLICATIONS

Description JP2003285202 (Translation) obtained at https://worldwide.espacenet.com/ (last visited Jul. 25, 2017).*
(Continued)

*Primary Examiner* — Ryan Rufo

(57) ABSTRACT

A beveling method for beveling the edge of the opening of a cross hole (2-1) formed in a workpiece (W) while rotating a conical tool (1), which has conical cutting blade sections (11-1, 11-2), wherein beveling is carried out so that a surface of the same width is formed on the edge of the opening of the cross hole (2-1) by controlling the height of the conical tool (1) and/or the position of the rotation shaft of the conical tool (1) on the basis of a conic section, which is generated when a cutting blade section (11-1, 11-2) is cut with an imaginary plane (V) that contacts the processing point (P) of the conical tool (1) on the cross hole (2-1), and the shape of the edge of the cross hole (2-1) opening.

2 Claims, 14 Drawing Sheets

(52) U.S. Cl.
CPC ...... *B23C 2220/16* (2013.01); *B23C 2265/08* (2013.01)

(58) Field of Classification Search
CPC . B23C 2265/08; B23C 2265/16; B23B 49/00; Y10T 409/30784; Y10T 409/307952; Y10T 409/304144
See application file for complete search history.

(56) References Cited

U.S. PATENT DOCUMENTS

| | | | |
|---|---|---|---|
| 4,480,821 A | | 11/1984 | Noll et al. |
| 4,589,805 A | * | 5/1986 | Duffner ................ B23B 31/026 279/5 |
| 4,690,595 A | | 9/1987 | Heule |
| 5,167,477 A | * | 12/1992 | Falkensson ........... B23B 51/105 144/154.5 |
| 5,173,013 A | * | 12/1992 | Gorse .................. B23B 51/048 408/22 |
| 7,441,991 B2 | * | 10/2008 | Yanagimoto .......... B23B 51/101 407/53 |
| 2007/0122245 A1 | | 5/2007 | Yanagimoto |
| 2007/0127997 A1 | * | 6/2007 | Muselli ................... B23B 31/36 409/132 |
| 2008/0005907 A1 | * | 1/2008 | Scheffer ................. B23B 31/11 30/94 |

FOREIGN PATENT DOCUMENTS

| | | | | |
|---|---|---|---|---|
| DE | 10119645 A1 | * | 5/2002 | ............. B23B 51/08 |
| JP | S63-067015 U | | 5/1988 | |
| JP | H03-256659 A | | 11/1991 | |
| JP | 09-253914 A | * | 9/1997 | ............. B23B 51/10 |
| JP | 11-129116 A | * | 5/1999 | ............. B23D 77/14 |
| JP | H11-320231 A | | 11/1999 | |
| JP | 2003-285202 A | * | 10/2003 | ............... B23B 5/16 |
| JP | 2004-223638 A | | 8/2004 | |
| JP | 2007-015028 A | * | 1/2007 | ............... B23C 3/12 |
| JP | 2007-265237 A | | 10/2007 | |
| JP | 2009-095912 | | 5/2009 | |
| JP | 2010-149271 A | | 7/2010 | |
| JP | 5150194 B2 | | 2/2013 | |

OTHER PUBLICATIONS

International Search Report for PCT/JP2014/061777, dated Jul. 15, 2014.
Written Opinion of the International Searching Authority for PCT/JP2014/061777, dated Jul. 15, 2014.
State Intellectual Property Office of the People's Republic of China, Office Action for Chinese patent application No. 201480024307.3, dated Sep. 2, 2016.
State Intellectual Property Office of the Peoples Republic of China, Search Report for Chinese Patent application No. 201480024307.3, dated Aug. 25, 2016.
Taiwan Intellectual Property Bureau Ministry of Economic Affairs, Office Action for Taiwanese patent application No. 103115333, dated Apr. 7, 2017.
European Patent Office, Extended European Search Report for EP patent application No. 14792203.3, dated Nov. 18, 2016.
Japan Patent Office, Office Action for Japanese patent application No. 2015-514835, dated Nov. 7, 2017.

* cited by examiner

CHAMFER MACHINING METHOD

FIELD

The present invention relates to a chamfer machining method for carrying out chamfer machining on an opening edge part of a cross hole formed on a workpiece while rotating a tool having a conical cutting blade.

BACKGROUND

When a cross hole is formed on a workpiece of a hollow rod material whose sections of both the outer peripheral surface and the inner peripheral surface are circular by using a conical tool having a conical cutting blade, the opening edge part of the cross hole is formed into an inclined surface along the arc of the outer and inner peripheral surfaces.

FIGS. 13A and 13B are diagrams explaining the case where the chamfer machining is carried out on an opening edge part of a cross hole from the outer diameter side of a workpiece of hollow rod material by using a conical tool, and FIG. 13A is a perspective view and FIG. 13B is a top view.

If the chamfer machining is carried out on the opening edge part from the outside of a workpiece W by using a conical tool, the amount of chamfering is not uniform, since the opening edge part of a cross hole 2-1 that is formed gradually changes from an inclined surface into a substantially flat surface along the curvature of the outer peripheral surface of the workpiece W, and then, further changes into an inclined surface, and the degree in which the cutting blade of the conical tool comes into contact with the opening edge part is different, and therefore there will be a part that is more chamfered and a part that is less chamfered. In other words, in the arc center axis line direction of the workpiece W, the conical tool comes into contact strongly and deeply, but in the direction perpendicular to the arc center axis line of the workpiece W, the conical tool comes into contact weakly and shallowly, and as a result, chamfering will result in an ellipse elongated in the arc axis line direction.

FIGS. 14A and 14B are diagrams explaining the case where the chamfer machining is carried out on an opening edge part of a cross hole from the inner diameter side of a workpiece of hollow rod material by using a conical tool, and FIG. 14A is a perspective view and FIG. 14B is a top view.

If chamfer and drilling machining is carried out on the opening edge part from the inside of the hollow portion of the workpiece W by using a conical tool, the amount of chamfering is not uniform, since the opening edge part of a cross hole 2-2 that is formed gradually changes from an inclined surface into a substantially flat surface along the curvature of the inner peripheral surface of the workpiece W, and then, further changes into an inclined surface, and the degree in which the cutting blade of the conical tool comes into contact with the opening edge part is different, and therefore there will be a part that is more chamfered and a part that is less chamfered. In other words, in the direction perpendicular to the arc center axis line direction of the workpiece W, on the contrary to the case of the outer peripheral surface explained in FIGS. 13A and 13B, the conical tool comes into contact strongly and deeply, but in the arc center axis line direction of the workpiece W, the conical tool comes into contact weakly and shallowly, and as a result, chamfering will result in an ellipse elongated in the direction perpendicular to the arc axis line.

Further, also in the case where the opening edge part of the cross hole that is formed on the workpiece is an opening edge part formed inclined with respect to the surface of the workpiece, the shape on the surface of the opening edge part is the shape of an ellipse, and therefore the opening edge part of the cross hole that is formed is not the shape of a cylinder whose axis center is the rotation axis of the conical tool.

Several chamfering devices and methods for carrying out chamfer machining on the opening edge portion of a cross hole having such an inclination have been proposed.

For example, there is a chamfering device whose chamfering bar for removing burrs generated around the hole entrance is made compact so as to be capable of being inserted into a narrow space (e.g., see Patent Document 1).

Further, for example, there is a method for removing burrs generated on the peripheral edge part on the backside of a through hole having a circular section, which is formed on the workpiece, from the surface side of the workpiece (e.g., see Patent Document 2).

Furthermore, for example, there is a grinding tool that has a grindstone and a holder that holds the grindstone, which is capable of appropriately grinding an area to be machined on the backside of a workpiece without the need to make troublesome adjustment by causing the grindstone to come into contact with the backside of the workpiece at all times even if the grindstone wears or there are bumps and dips in the area to be machined of the workpiece by causing the grinding tool to have such a structure in which a first biasing member that biases the grindstone toward the holder side as well as supporting the grindstone so as to be movable in both directions in the axis line direction of the holder is provided in the holder, and in which the grindstone comes into contact with the workpiece with an optimum load in accordance with the biasing force of the first biasing member without the need to carry out control of the position in the axis line direction of the grindstone with respect to the workpiece with a high accuracy (e.g., see Patent Document 3).

For example, there is a corner part machining tool having a main body in which a space through which cutting fluid can pass is formed and a blade part provided in the main body and capable of changing its position to the outside of the main body, and machining a corner part by the blade part by changing the position of the blade part to the outside of the main body in accordance with a change in the static pressure of the cutting fluid having passed through the space and by rotating the main body (e.g., see Patent Document 4).

RELATED DOCUMENTS

[Patent Document 1] Japanese Unexamined Utility Model (Registration) Application Publication No. 63-67015

[Patent Document 2] Japanese Laid Open Patent Document No. 2004-223638

[Patent Document 3] Japanese Patent No. 5150194

[Patent Document 4] Japanese Laid Open Patent Document No. 2010-149271

SUMMARY

Technical Problem

An object of the present invention is to provide a chamfer machining method for carrying out chamfer machining of an opening edge part of a cross hole formed on a workpiece while rotating a conical tool having a conical cutting blade.

Solution to Problem

According to the present invention, in a chamfer machining method for carrying out chamfer machining of an opening edge part of a cross hole formed on a workpiece while rotating a conical tool having a conical cutting blade, the chamfer machining is carried out so that a surface having the same width is formed on the opening edge part of the cross hole by controlling at least one of the height of the conical tool and the position of the rotation axis of the conical tool based on a conic section that is generated when the cutting blade is cut by a virtual plane that comes into contact with a machining point on which the conical tool machines the cross hole, and the shape of the opening edge part of the cross hole.

In the above-described chamfer machining method, at least one of the height of the conical tool and the position of the rotation axis of the conical tool is controlled based on the degree measure of the vertex angle of the conical shape of the cutting blade of the conical tool and the position on the generating line, the inner diameter and the outer diameter of the hollow shape of the workpiece, and the inner diameter of the cross hole.

Further, in the above-described chamfer machining method, at least one of the height of the conical tool in the penetrating direction of the cross hole of the conical tool and the position of the rotation axis of the conical tool is controlled so that the above-described conic section comes into contact with the opening edge part of the cross hole at one point.

Advantageous Effects of Invention

According to the present invention, it is possible to implement a chamfer machining method for carrying out chamfer machining of an opening edge part of a cross hole formed on a workpiece while rotating a conical tool having a conical cutting blade, for example, in the case where the opening edge part of the cross hole is located in the arc-shaped part of the workpiece or in the case where the surface of the workpiece is located on the surface inclined with respect to the cross hole.

DESCRIPTION OF EMBODIMENTS

Figure 1:
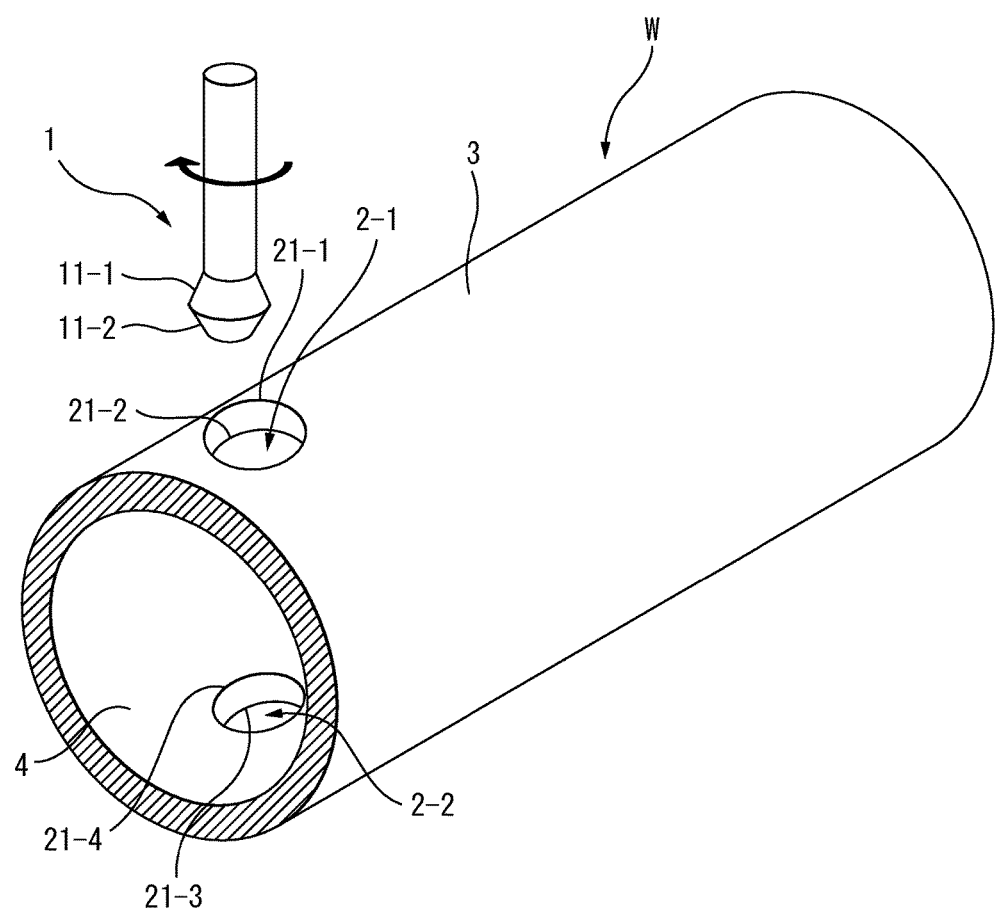
FIG. 1 is a perspective view explaining chamfer machining of an opening edge part of a cross hole formed on a workpiece of hollow rod material having an outer peripheral surface and an inner peripheral part whose sectional shape is a circle.

FIG. 1 is a perspective view explaining chamfer machining of an opening edge part of a cross hole formed on a workpiece of hollow rod material having an outer peripheral surface and an inner peripheral part whose sectional shape is a circle.

When cross holes 2-1 and 2-2 are formed on a workpiece W, on a convex arc-shaped part 3 of the outer peripheral surface of the workpiece W, an opening edge part 21-1 of the cross hole 2-1 and an opening edge part 21-3 of the cross hole 2-2 are located and on a concave arc-shaped part 4 of the inner peripheral surface of the workpiece W, an opening edge part 21-2 of the cross hole 2-1 and an opening edge part 21-4 of the cross hole 2-2 are located. On the opening edge part 21-1, the opening edge part 21-3, the opening edge part 21-2, and the opening edge part 21-4, the chamfer machining is carried out while rotating a conical tool 1 having conical cutting blades 11-1 and 11-2.

Figure 2A:
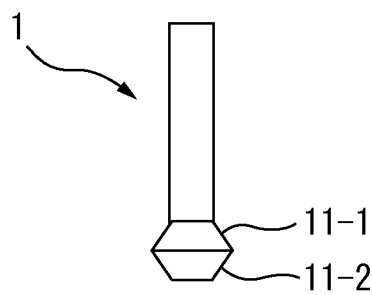
FIG. 2A is side views illustrating conical tools used in the chamfer machining.
Figure 2B:
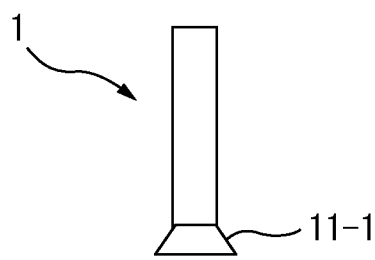
FIG. 2B is side views illustrating conical tools used in the chamfer machining.
Figure 2C:
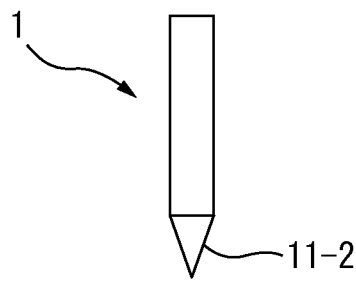
FIG. 2C is side views illustrating conical tools used in the chamfer machining.

FIGS. 2A to 2C are side views illustrating conical tools used in the chamfer machining. As the conical tool 1, for example, there are a conical tool having the cutting part formed by bonding the cutting blade 11-1 whose conical shape widens toward the blade edge and the cutting blade 11-2 whose conical shape narrows toward the blade edge as illustrated in FIG. 2A, a conical tool having the cutting blade 11-1 whose conical shape widens toward the blade edge as illustrated in FIG. 2B, and a conical tool having the cutting blade 11-2 whose conical shape narrows toward the blade edge as illustrated in FIG. 2C. Each of the conical tools 1 is appropriately selected and used in accordance with whether the opening edge part of the cross hole on which the chamfer machining is to be carried out is located on the convex arc-shaped part or the concave arc-shaped part of the workpiece W, or in accordance with the size of the cutting blade, or the like.

Figure 3:
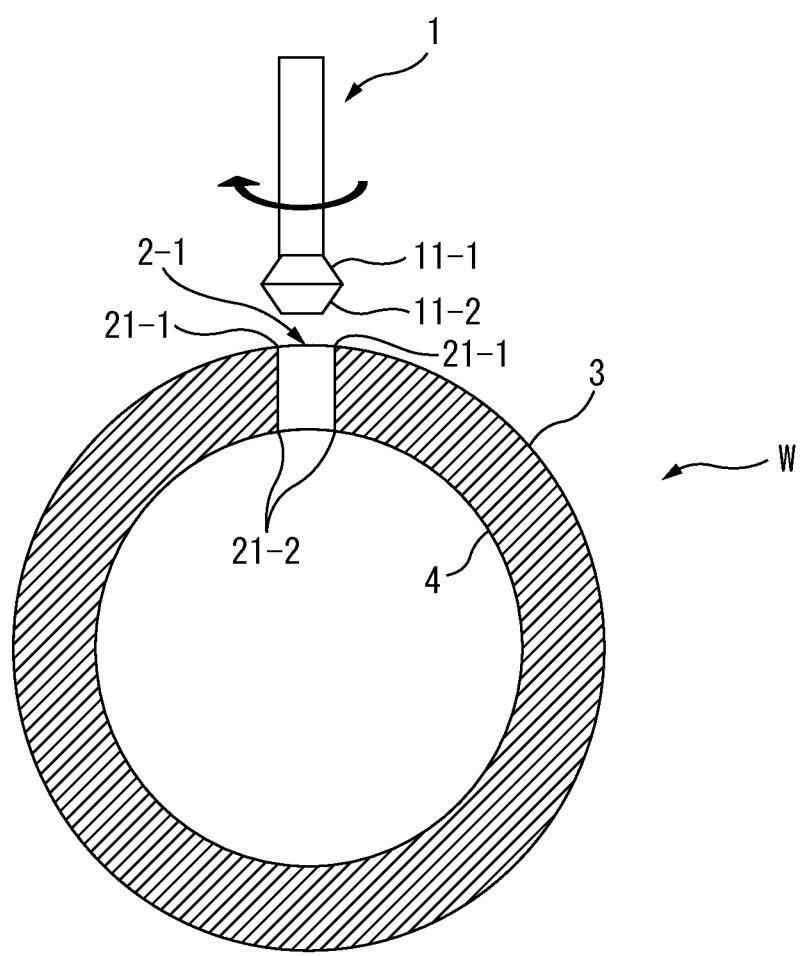
FIG. 3 is a section view explaining a conical tool that is used in the chamfer machining of the opening edge part of the cross hole located on the convex arc-shaped part of the workpiece of hollow rod material.

FIG. 3 is a section view explaining a conical tool that is used in the chamfer machining of the opening edge part of the cross hole located on the convex arc-shaped part of the workpiece of hollow rod material. As illustrated in FIG. 3, in the case where, for example, the conical tool 1 illustrated in FIG. 2A is used in the chamfer machining of the opening edge part 21-1 of the workpiece W, the chamfer machining is carried out by pushing the cutting blade 11-2 against the opening edge part 21-1 from the outside of the workpiece W and by rotating the conical tool 1. Alternatively, it is also possible to use the conical tool 1 illustrated in FIG. 2C (not illustrated) and in this case, the chamfer machining is carried out by pushing the cutting blade 11-2 against the opening edge part 21-1 from the outside of the workpiece W and by rotating the conical tool 1.

Figure 4:
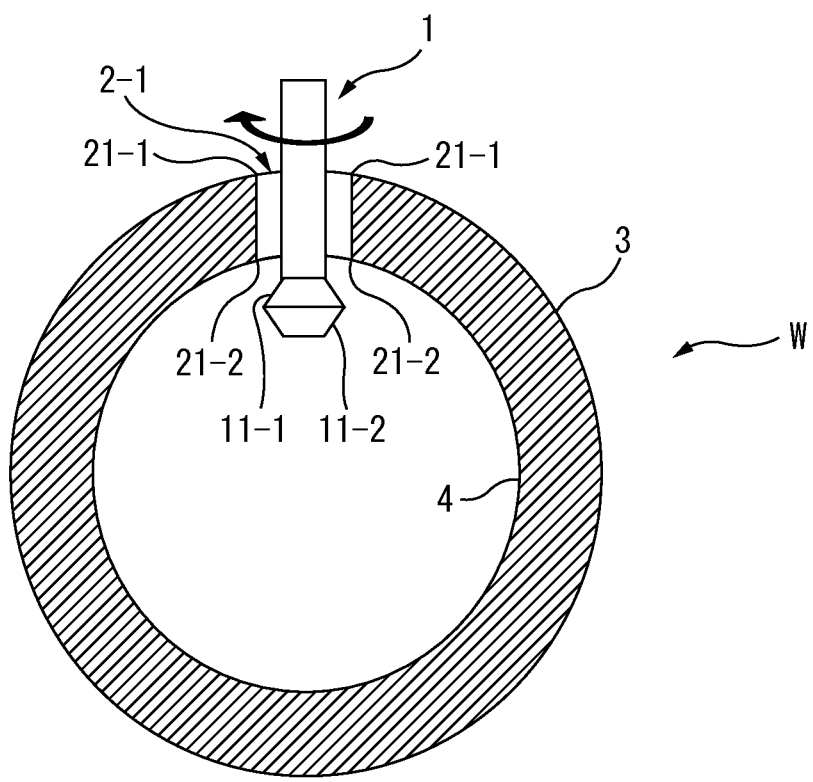
FIG. 4 is a section view (part 1) explaining a conical tool that is used in the chamfer machining of the opening edge part of the cross hole located on the concave arc-shaped part of the workpiece of hollow rod material.

FIG. 4 is a section view (part 1) explaining a conical tool that is used in the chamfer machining of the opening edge part of the cross hole located on the concave arc-shaped part of the workpiece of hollow rod material. As illustrated in FIG. 4, in the case where, for example, the conical tool 1 illustrated in FIG. 2A is used in the chamfer machining of the opening edge part 21-1 of the workpiece W, the chamfer machining is carried out by inserting the cutting blades 11-1 and 11-2 into the cross hole 2-1, by pushing the cutting blade 11-1 against the opening edge part 21-2 from the inside of the hollow portion of the workpiece W, and by rotating the conical tool 1. Alternatively, it is also possible to use the conical tool 1 illustrated in FIG. 2B (not illustrated) and in this case, the chamfer machining is carried out by inserting the cutting blade 11-1 into the cross hole 2-1, by pushing the cutting blade 11-1 against the opening edge part 21-2 from the inside of the hollow portion of the workpiece W, and by rotating the conical tool 1.

Figure 5A:
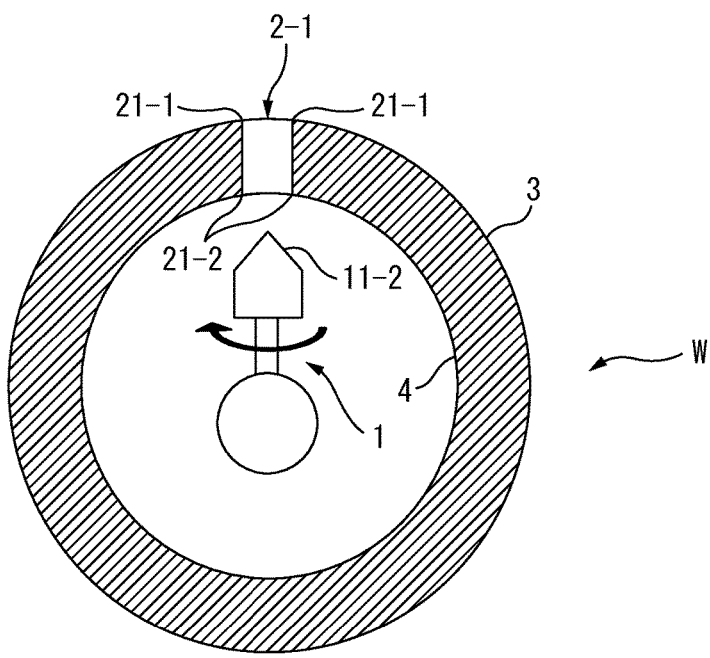
FIG. 5A is a diagram (part 2) explaining a conical tool that is used in the chamfer machining of the opening edge part of the cross hole located on the concave arc-shaped part of the workpiece of hollow rod material, and a vertical section view when viewed from a plane perpendicular to the arc center axis direction of the workpiece.
Figure 5B:
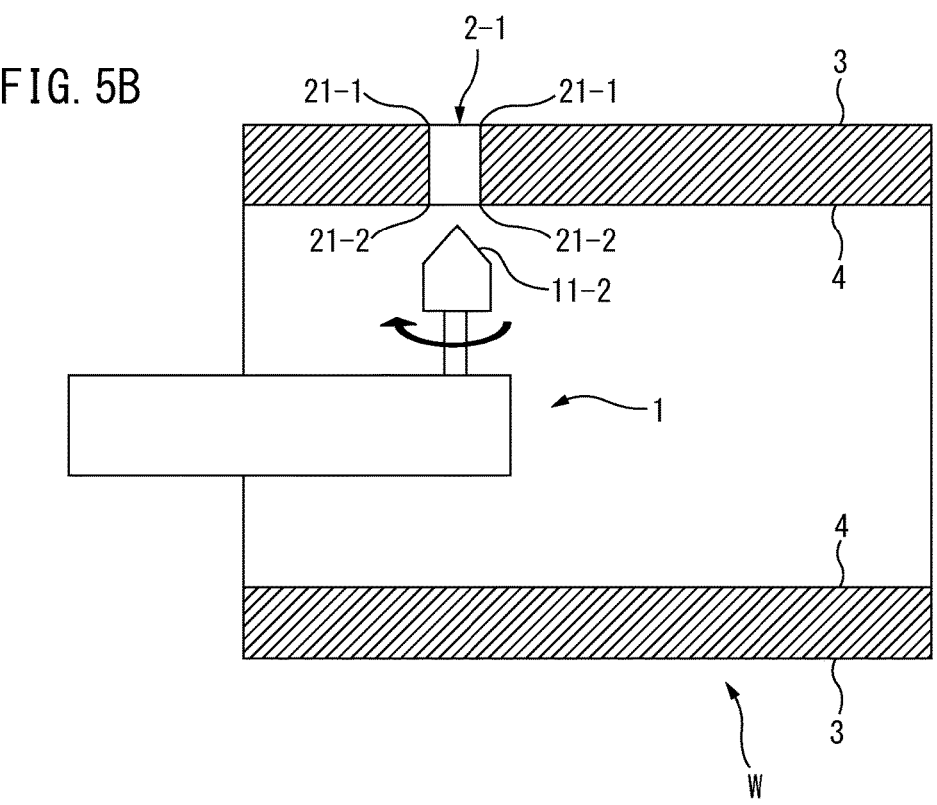
FIG. 5B is a diagram (part 2) explaining a conical tool that is used in the chamfer machining of the opening edge part of the cross hole located on the concave arc-shaped part of the workpiece of hollow rod material and a transverse section view when viewed along the arc center axis direction of the workpiece.

FIGS. 5A and 5B are diagrams (part 2) explaining a conical tool that is used in the chamfer machining of the opening edge part of the cross hole located on the concave arc-shaped part of the workpiece of hollow rod material, and FIG. 5A is a vertical section view when viewed from a plane perpendicular to the arc center axis direction of the workpiece and FIG. 5B is a transverse section view when viewed along the arc center axis direction of the workpiece. As illustrated in FIGS. 5A and 5B, in the case where, for example, the conical tool 1 illustrated in FIG. 2C is used in the chamfer machining of the opening edge part 21-2 of the workpiece W, the chamfer machining is carried out by inserting the cutting blade 11-2 into the hollow portion of the workpiece W, by pushing the cutting blade 11-2 against the opening edge part 21-2 from the inside of the hollow portion of the work piece W, and by rotating the conical tool 1.

Figure 6A:
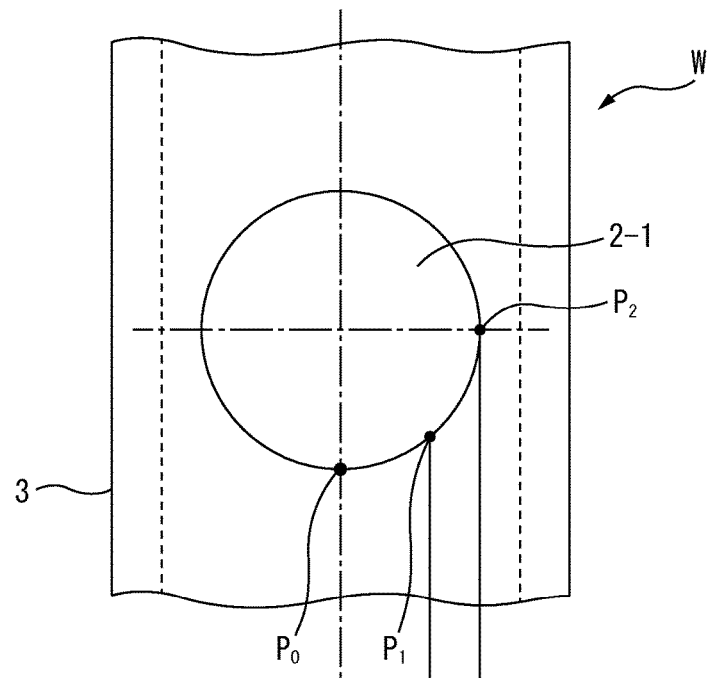
FIG. 6A is a diagram explaining a position relationship between the workpiece of hollow rod material and the cutting blade of the conical tool in the chamfer machining and a top view of the cross hole located on the concave arc-shaped part of the workpiece.
Figure 6B:
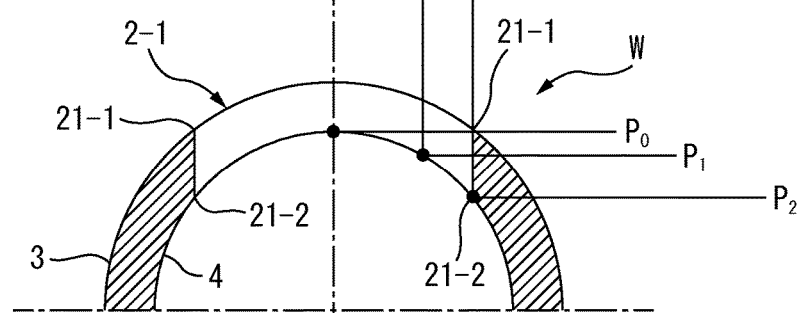
FIG. 6B is a diagram explaining a position relationship between the workpiece of hollow rod material and the cutting blade of the conical tool in the chamfer machining and a section view of the cross hole located on the concave arc-shaped part of the workpiece.
Figure 6C:
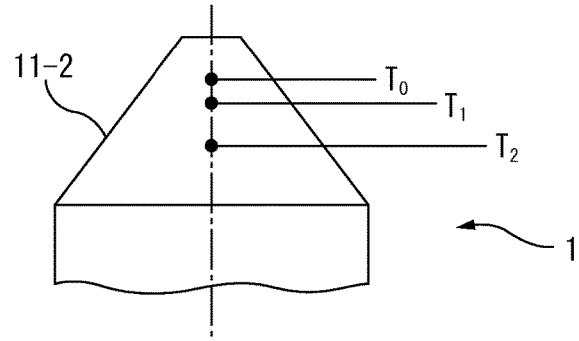
FIG. 6C is a diagram explaining a position relationship between the workpiece of hollow rod material and the cutting blade of the conical tool in the chamfer machining and a side view of the cutting blade of the conical tool.

FIGS. 6A to 6C are diagrams explaining a position relationship between the workpiece of hollow rod material and the cutting blade of the conical tool in the chamfer machining, and FIG. 6A is a top view of the cross hole located on the concave arc-shaped part of the workpiece, FIG. 6B is a section view of the cross hole located on the concave arc-shaped part of the workpiece, and FIG. 6C is a side view of the cutting blade of the conical tool.

In the case where the chamfer machining of the cross hole 2-1 located on the concave arc-shaped part 4 illustrated in FIG. 6A and FIG. 6B is carried out by using the conical tool 1 illustrated in FIG. 6C, points $P_0$, $P_1$, and $P_2$ that seem to be located on the circle of the cross hole 2-1 in the top view as illustrated in FIG. 6A are located on the concave arc-shaped part 4 of the workpiece W, and therefore as illustrated in FIG. 6B, the position of the point in height in the penetrating direction of the cross hole 2-1 becomes lower as the point becomes more distant from the arc center axis. For example, when the chamfer machining is carried out by taking the point $P_0$ as the machining point by using a point $T_0$ of the cutting blade 11-2 of the conical tool 1 illustrated in FIG. 6C, if the cutting blade 11-2 is moved in the direction perpendicular to the arc center axis direction while rotating the conical tool without changing the height of the cutting blade 11-2, resulting from the inclination having a curvature of the inner peripheral surface, a point $T_1$ of the cutting blade 11-2 comes into contact with the point $P_1$ located in a position lower than the machining point $P_0$ and a point $T_2$ of the cutting blade 11-2 comes into contact with the point $P_2$ located in a position lower than the machining point $P_1$, and therefore the points P₁ and P₂ that are not scheduled to be machined are unnecessarily cut.

Figure 7A:
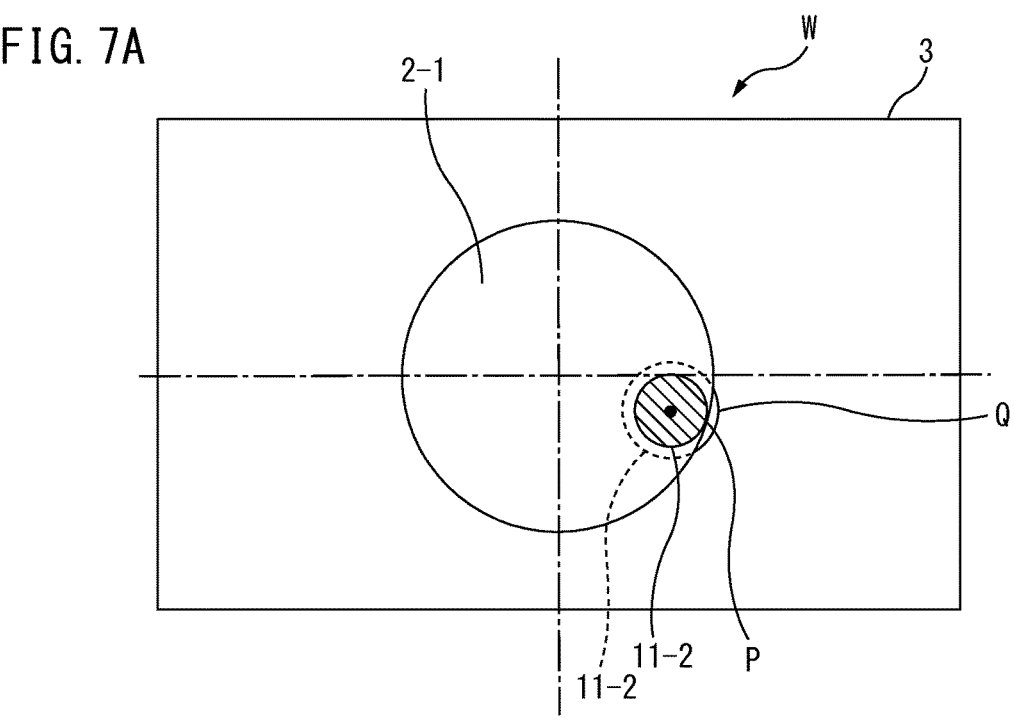
FIG. 7A is a diagram explaining the principle of the chamfer machining method according to the present invention.
Figure 7B:
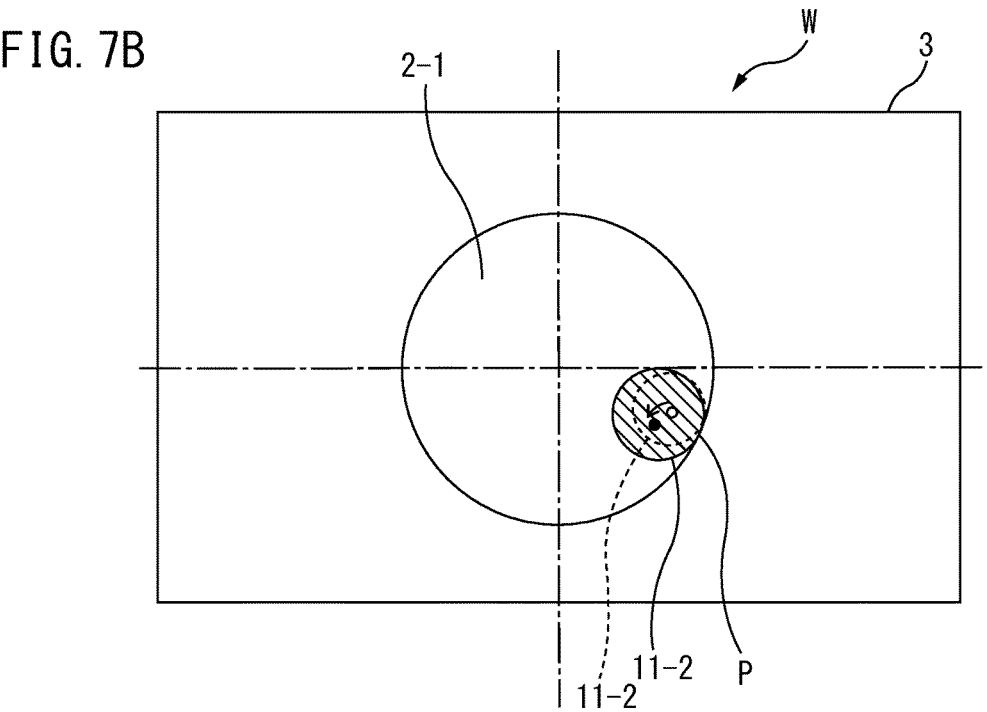
FIG. 7B is a diagram explaining the principle of the chamfer machining method according to the present invention.

FIGS. 7A and 7B are diagrams explaining the principle of the chamfer machining method according to the present invention. As illustrated in FIG. 7A, in the case where the chamfer machining of the cross hole 2-1 is carried out by using the cutting blade 11-2 of the conical tool, if the cutting blade 11-2 is rotated in the state where the cutting blade 11-2 is pushed against a machining point P for the inner peripheral surface side of the workpiece W, by the rotation of the inclined surface of the cutting blade 11-2, in the arc of the inner peripheral surface, the cutting blade 11-2 comes into contact with the convex arc-shaped part 3 in a position of a portion Q located higher than the machining point P, and therefore the portion Q that is not scheduled to be machined is cut unnecessarily. Thus, in the present invention, control to successively change at least one of and the position of the rotation axis the height of the conical tool 1 is carried out so that the cutting blade 11-2 comes into contact with the inner wall of the workpiece W only at the machining point P when moving the conical tool 1 while rotating it. FIG. 7B illustrates an example in which the position of the rotation axis of the conical tool 1 is changed in the direction in which the distance from the opening edge part of the cross hole 2-1 becomes greater so that the cutting blade 11-2 comes into contact with the inner wall of the workpiece W only at the machining point P when moving the conical tool 1 while rotating it. As a modification example, although not illustrated here, it is also possible to successively change the height of the conical tool 1, or to successively change both the height of the conical tool 1 and the position of the rotation axis of the conical tool 1 so that the cutting blade 11-2 comes into contact with the inner wall of the workpiece W only at the machining point P when moving the conical tool 1 while rotating it.

In the chamfer machining method according to the present invention, the chamfer machining is carried out so that a surface having the same width is formed on the opening edge part of the cross hole by controlling the height of the conical tool and the position of the rotation axis of the conical tool based on the conic section that is generated when the cutting blade of the conical tool is cut by a virtual plane that comes into contact with the machining point on which the conical tool machines the cross hole, and the shape of the opening edge part of the cross hole. In the following, the conic section is explained.

Figure 8A:
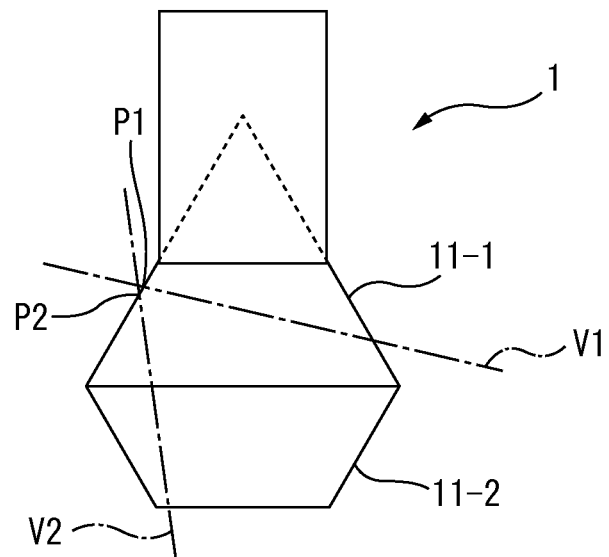
FIG. 8A is a diagram explaining the conic section that is generated when the cutting blade of the conical tool is cut by a virtual plane.
Figure 8B:
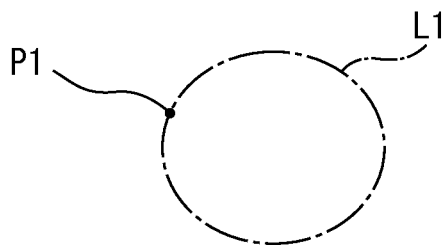
FIG. 8B is a diagram explaining the conic section that is generated when the cutting blade of the conical tool is cut by a virtual plane.
Figure 8C:
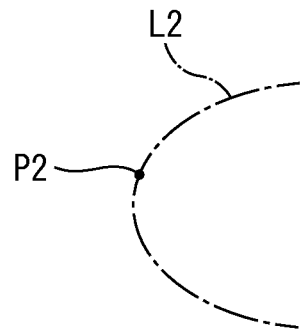
FIG. 8C is a diagram explaining the conic section that is generated when the cutting blade of the conical tool is cut by a virtual plane.

FIGS. 8A to 8C are diagrams explaining the conic section that is generated when the cutting blade of the conical tool is cut by a virtual plane. As an example, the case is explained where the cutting blade 11-1 of the conical tool 1 illustrated in FIG. 2A is cut by a virtual plane. The conic section is a generic term of a group of curves obtained as sections when a conical surface is cut by an arbitrary plane. If the conical surface is cut by a plane that intersects with all the generating lines of the cone and is not parallel to the bottom surface, the conic section is an ellipse. If the conical surface is cut by a plane that is not parallel to the generating line of the cone, the conic section is a hyperbola. If the conical surface is cut by a plane parallel to the generating line, the conic section is a parabola. For example, if the cutting blade 11-1 is cut by a virtual plane V1 that passes through a point P1 as illustrated in FIG. 8A, a conic section L1 is an ellipse as illustrated in FIG. 8B. Further, for example, if the cutting blade 11-1 is cut by a virtual plane V2 that passes through a point P2 as illustrated in FIG. 8A, a conic section L2 is a hyperbola as illustrated in FIG. 8C.

Figure 9A:
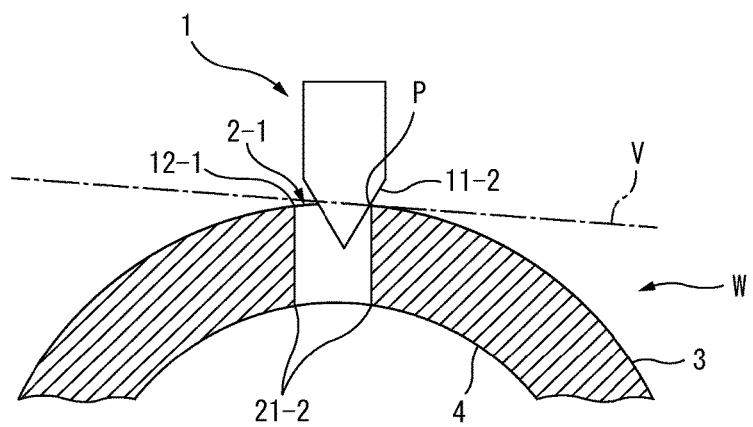
FIG. 9A is a section view (part 1) explaining the chamfer machining of the opening edge part of the cross hole located on the convex arc-shaped part of the workpiece of hollow rod material.
Figure 9B:
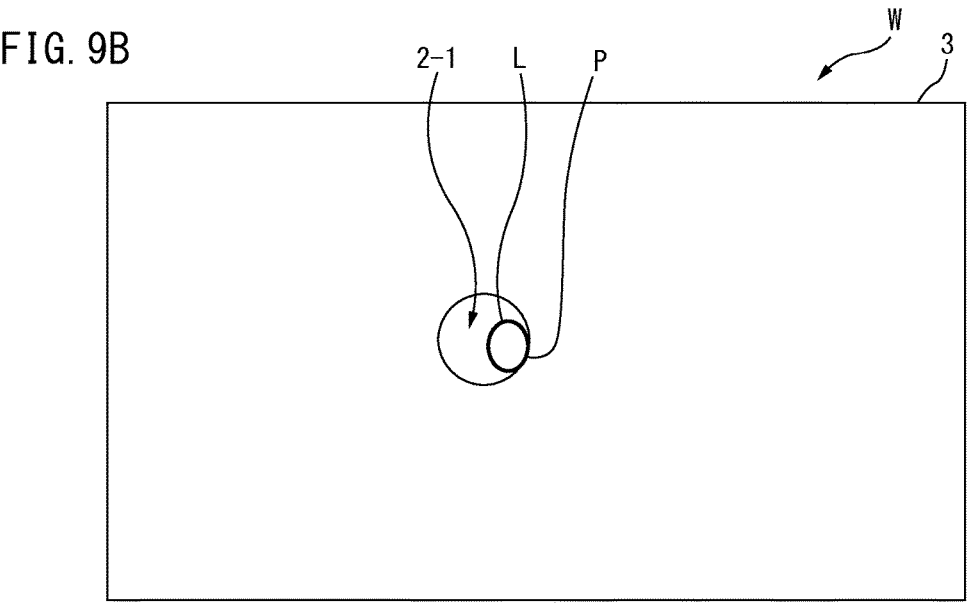
FIG. 9B is a top view (part 1) explaining the chamfer machining of the opening edge part of the cross hole located on the convex arc-shaped part of the workpiece of hollow rod material.

FIGS. 9A and 9B are diagrams (part 1) explaining the chamfer machining of the opening edge part of the cross hole located on the convex arc-shaped part of the workpiece of hollow rod material, and FIG. 9A is a section view and FIG. 9B is a top view. As illustrated in FIG. 9A, in the case where the chamfer machining is carried out on a machining point P of the opening edge part 21-1 by the cutting blade 11-2, a virtual plane V that is tangent to the machining point P intersects with all the generating lines of the cutting blade 11-2 and is not parallel to the bottom surface, and therefore a conic section L that is generated when the cutting blade 11-2 is cut by the virtual plane V is an ellipse as illustrated in FIG. 9B. The chamfer machining is carried out so that a surface having the same width is formed on the opening edge part 21-1 by pushing the cutting blade 11-2 against the machining point P and rotating the conical tool 1 by controlling the height of the conical tool 1 and the position of the rotation axis of the conical tool 1 so that the conic section L, which is an ellipse, comes into contact with the inner wall of the cross hole 2-1 at one point.

Figure 10A:
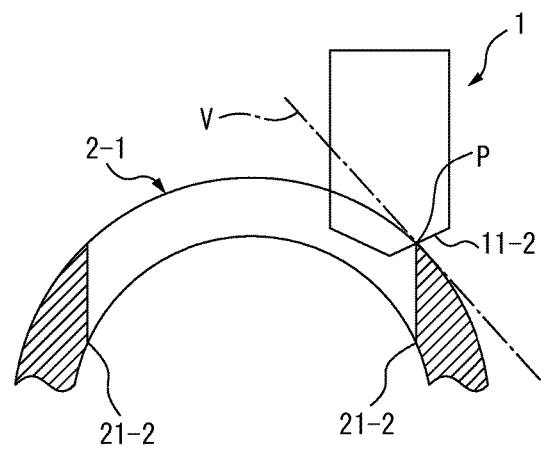
FIG. 10A is a section view (part 2) explaining the chamfer machining of the opening edge part of the cross hole located on the convex arc-shaped part of the workpiece of hollow rod material.
Figure 10B:
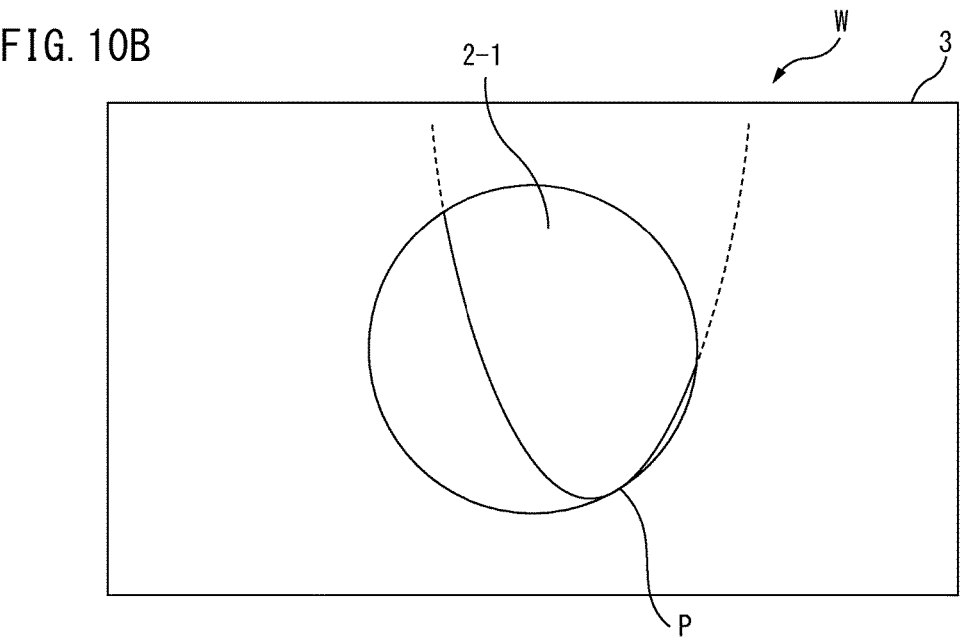
FIG. 10B is a top view (part 2) explaining the chamfer machining of the opening edge part of the cross hole located on the convex arc-shaped part of the workpiece of hollow rod material.

FIGS. 10A and 10B are diagrams (part 2) explaining the chamfer machining of the opening edge part of the cross hole located on the convex arc-shaped part of the workpiece of hollow rod material, and FIG. 10A is a section view and FIG. 10B is a top view. As illustrated in FIG. 10A, in the case where the chamfer machining is carried out on the machining point P of the opening edge part 21-1 by the cutting blade 11-2, the virtual plane V that comes into contact with the machining point P is not parallel to the generating line of the cutting blade 11-2 having the shape of a cone, and therefore the conic section L that is generated when the cutting blade 11-2 is cut by the virtual plane V is a hyperbola as illustrated in FIG. 10B. The chamfer machining is carried out so that a surface having the same width is formed on the opening edge part 21-1 by pushing the cutting blade 11-2 against the machining point P and rotating the conical tool 1 by controlling the height of the conical tool 1 and the position of the rotation axis of the conical tool 1 so that the conic section L, which is a hyperbola, comes into contact with the inner wall of the cross hole 2-1 at one point.

As described above, the kind of the conic section L that is generated when the cutting blade is cut by the virtual plane V that comes into contact with the machining point P of the conical tool 1 for the cross hole is determined by the degree measure of the vertex angle of the conical shape of the cutting blade of the conical tool 1 and the position on the generating line of the cutting blade of the conical tool 1, the inner diameter and the outer diameter of the hollow rod material of the workpiece W, and the inner diameter of the cross hole. Thus, in the present invention, the height of the conical tool 1 and the position of the rotation axis of the conical tool 1 are controlled based on the degree measure of the vertex angle of the conical shape of the cutting blade of the conical tool 1 and the position on the generating line, the inner diameter and the outer diameter of the hollow rod material of the workpiece W, and the inner diameter of the cross hole. The height of the conical tool 1 and the position of the rotation axis of the conical tool 1 are controlled by a control unit (not illustrated) configured to control the rotational operation and the height of the conical tool 1.

For the opening edge part formed either on the convex arc-shaped part or on the concave arc-shaped part of the workpiece of hollow rod material, it is also possible to calculate a conic section by setting a virtual plane with the opening edge part as a machining point. Explanation is given as follows with reference to FIGS. 11A and 11B and FIGS. 12A and 12B.

Figure 11A:
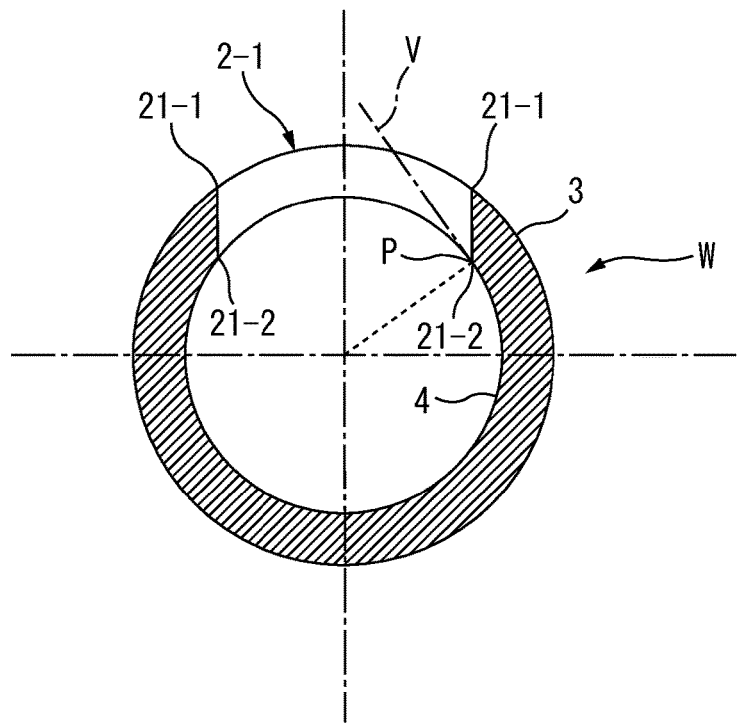
FIG. 11A is a section view explaining the machining point at the opening edge part of the cross hole located on the concave arc-shaped part of the workpiece of hollow rod material.
Figure 11B:
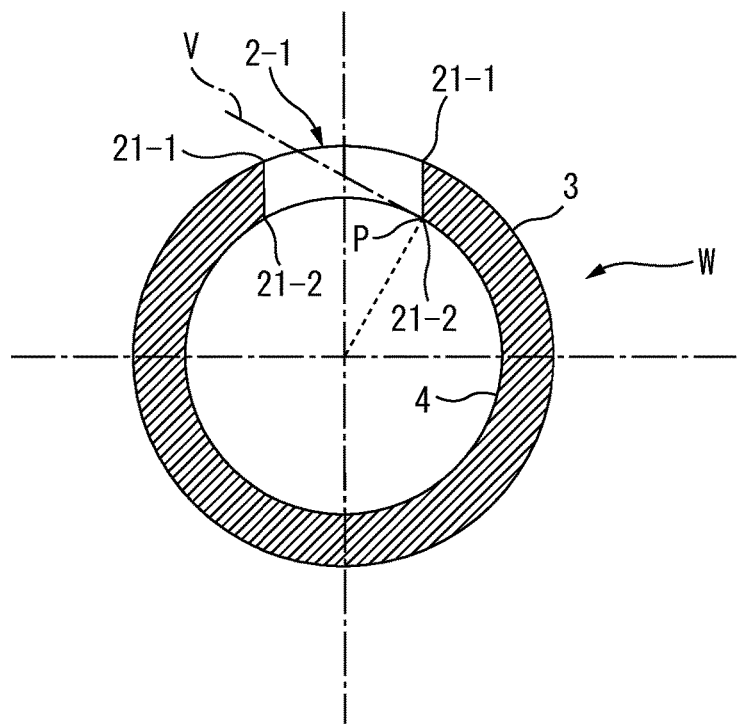
FIG. 11B is a section view explaining the machining point at the opening edge part of the cross hole located on the concave arc-shaped part of the workpiece of hollow rod material.

FIGS. 11A and 11B are section views explaining the machining point at the opening edge part of the cross hole located on the concave arc-shaped part of the workpiece of hollow rod material. In the case where the chamfer machining is carried out on the opening edge part 21-2 formed on the concave arc-shaped part 4 of the workpiece W, the virtual plane V that comes into contact with the machining point P on the opening edge part 21-2 is set and the conic section that is generated when the cutting blade (not illustrated) of the conical tool is cut by the virtual plane V is calculated. The chamfer machining is carried out so that a surface having the same width is formed on the opening edge part 21-2 by pushing the cutting blade against the machining point P and rotating the conical tool by controlling the height of the conical tool 1 and the position of the rotation axis the conical tool 1 so that the calculated conic section comes into contact with the inner wall of the cross hole 2-1 at one point. Depending on the inner diameter of the cross hole 2-1, the virtual plane V that is set changes as illustrated in FIG. 11A and FIG. 11B.

Figure 12A:
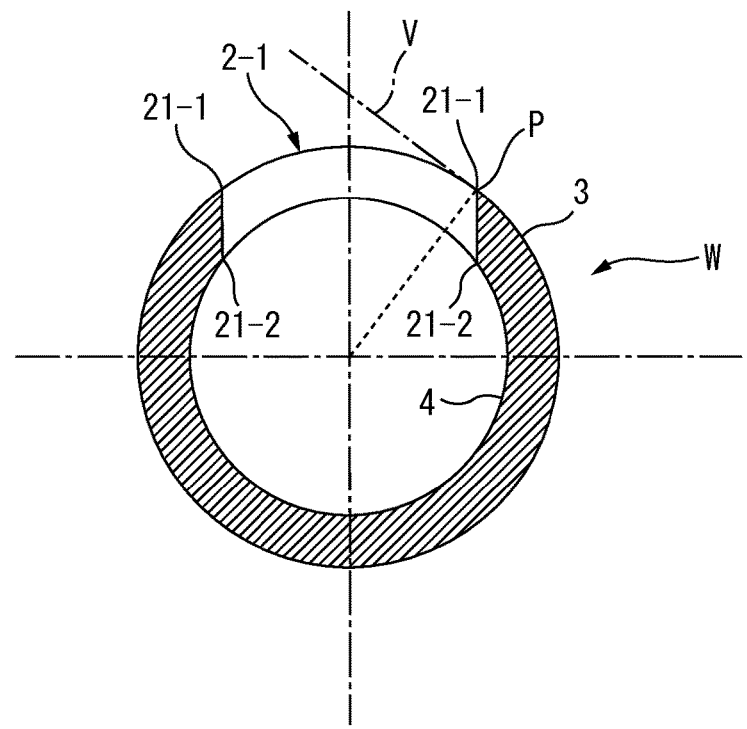
FIG. 12A is a section view explaining the machining point at the opening edge part of the cross hole located on the convex arc-shaped part of the workpiece of hollow rod material.
Figure 12B:
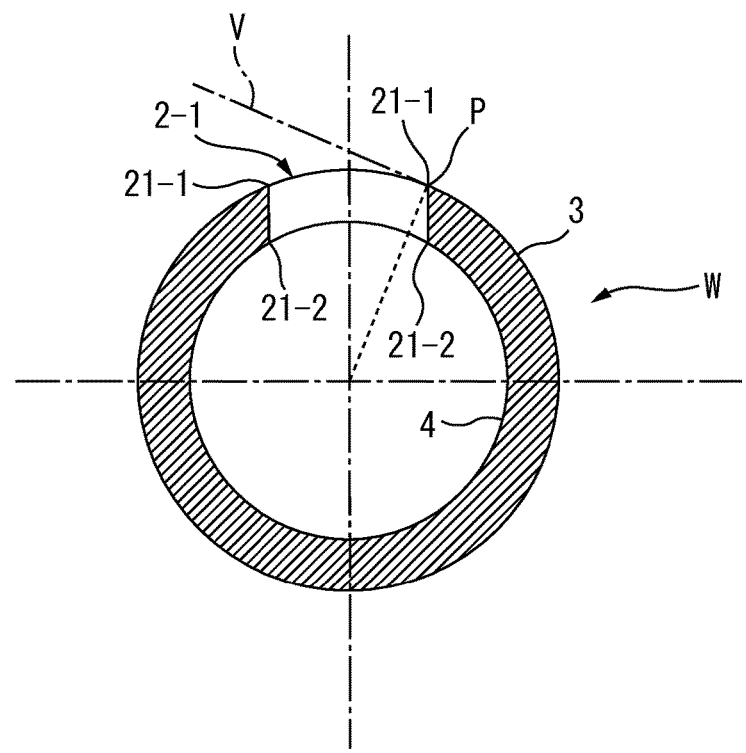
FIG. 12B is a section view explaining the machining point at the opening edge part of the cross hole located on the convex arc-shaped part of the workpiece of hollow rod material.
Figure 13A:
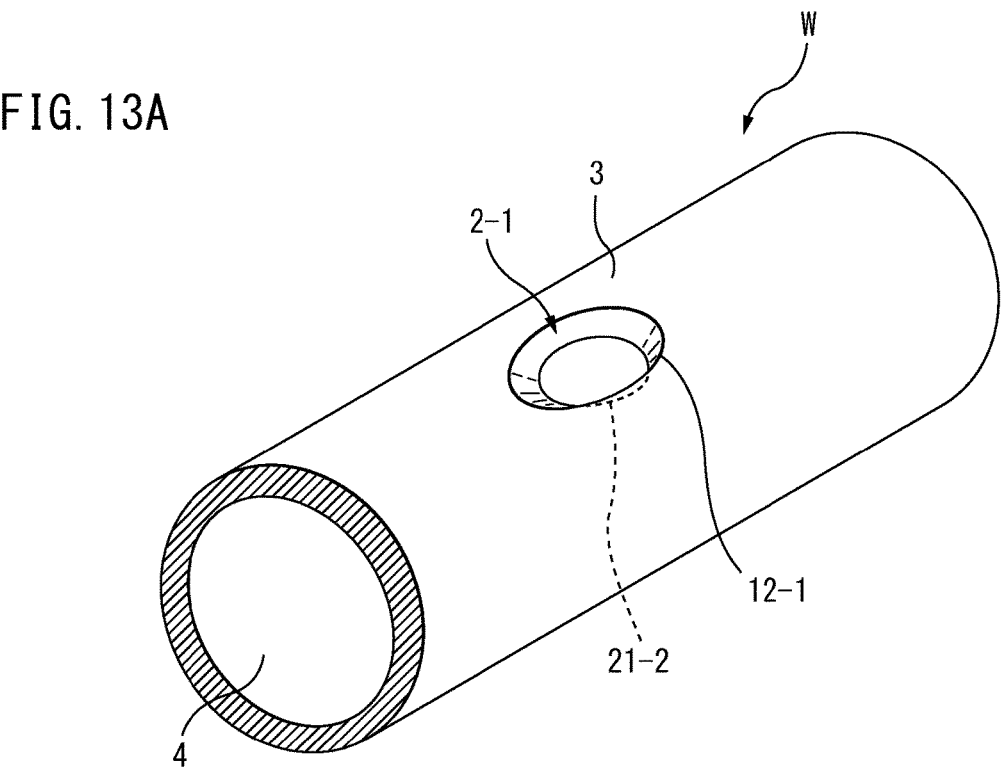
FIG. 13A is a perspective view explaining the case where the chamfer machining is carried out on an opening edge part of a cross hole from the outer diameter side of a workpiece of hollow rod material by using a conical tool.
Figure 13B:
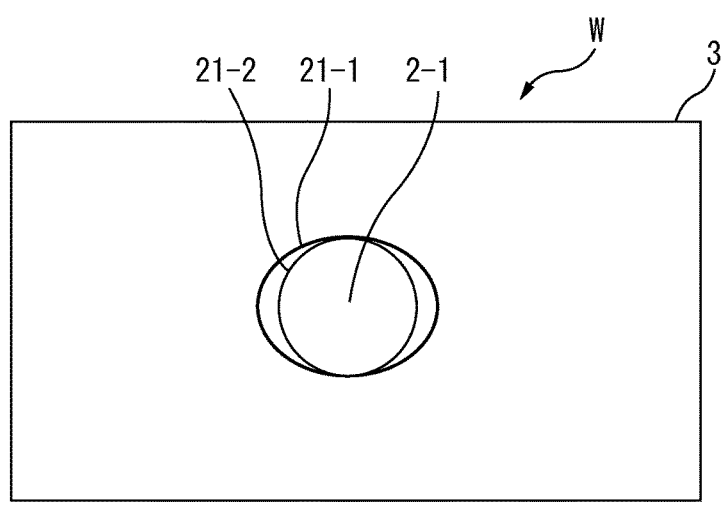
FIG. 13B is a top view explaining the case where the chamfer machining is carried out on an opening edge part of a cross hole from the outer diameter side of a workpiece of hollow rod material by using a conical tool.
Figure 14A:
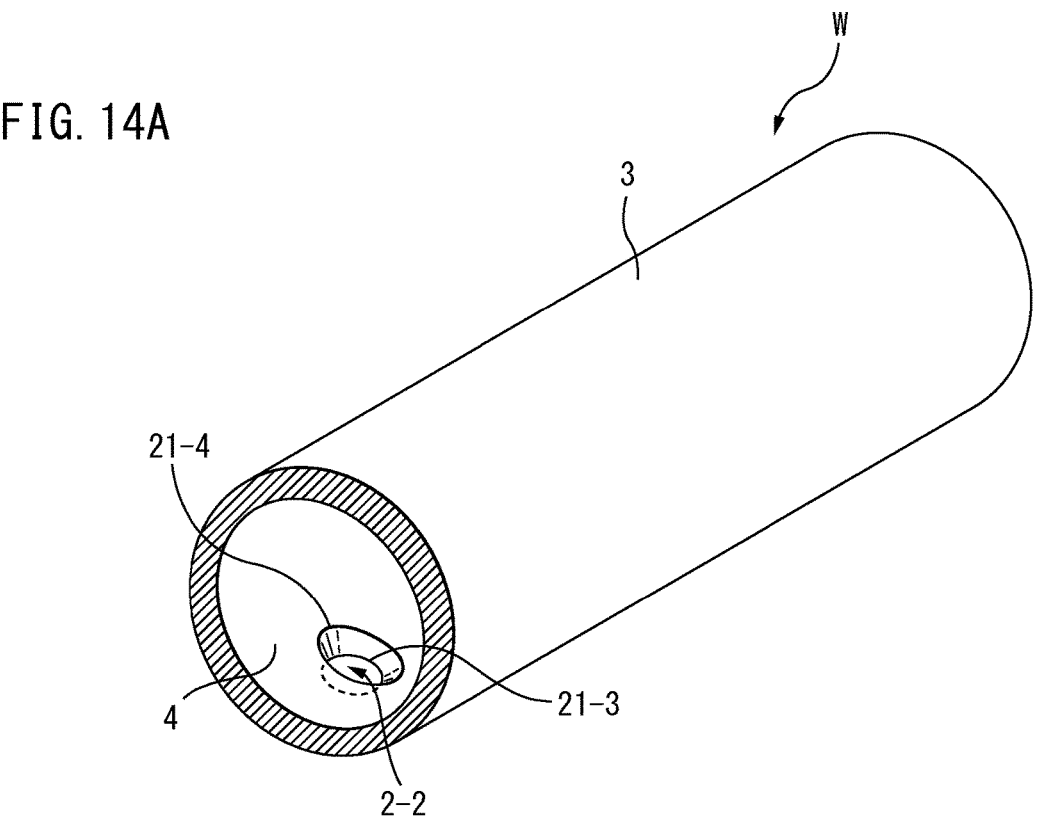
FIG. 14A is a perspective view explaining the case where the chamfer machining is carried out on an opening edge part of a cross hole from the inner diameter side of a workpiece of hollow rod material by using a conical tool.
Figure 14B:
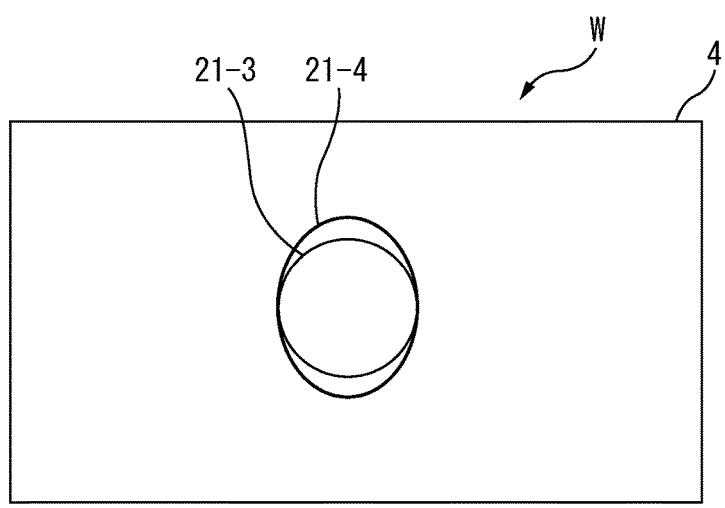
FIG. 14B is a top view explaining the case where the chamfer machining is carried out on an opening edge part of a cross hole from the inner diameter side of a workpiece of hollow rod material by using a conical tool.

FIGS. 12A and 12B are section views explaining the machining point at the opening edge part of the cross hole located on the convex arc-shaped part of the workpiece of hollow rod material. In the case where the chamfer machining is carried out on the opening edge part 21-1 formed on the convex arc-shaped part 3 of the workpiece W, the virtual plane V that comes into contact with the machining point P on the opening edge part 21-1 is set and the conic section that is generated when the cutting blade (not illustrated) of the conical tool is cut by the virtual plane V is calculated. The chamfer machining is carried out so that a surface having the same width is formed on the opening edge part 21-2 by pushing the cutting blade against the machining point P and rotating the conical tool by controlling the height of the conical tool 1 and the position of the rotation axis of the conical tool 1 so that the calculated conic section comes into contact with the inner wall of the cross hole 2-1 at one point. Depending on the inner diameter of the cross hole 2-1, the virtual plane V that is set changes as illustrated in FIG. 12A and FIG. 12B.

In the above-described embodiment, the case is explained where the opening edge part on which the chamfer machining is carried out is provided on the concave arc-shaped part and the convex arc-shaped part of the workpiece, however it is also possible to apply the chamfer machining method of the present invention in the case of an opening edge part drilled inclined with respect to the surface of a workpiece. Further, it is also possible to apply the chamfer machining method of the present invention in the case where the opening edge part on which the chamfer machining is carried out is an elongated hole or quadrangular hole, or in the case where the cross hole does not have the shape of a cylinder but a tapered shape. The workpiece to which the chamfer machining method of the present invention can be applied is not limited to a round material in the shape of a cylinder, and a round material having a tapered shape in which the outer diameter reduces in one direction, or a rectangular material may be accepted.

It is also possible to apply the chamfer machining method of the present invention to the chamfer machining at the inside portion of a workpiece, such as a cross hole that intersects with the center hole along the axis direction of the workpiece, and an intersecting part between cross holes. In this case, the chamfer machining is carried out by inserting the conical tool from the center hole or from one of the cross holes.

It is possible to regard a certain one point of a spherical tool as a conical cutting blade of a conical tool, and therefore it is also possible to carry out the chamfer machining method of the present invention by using a spherical tool in place of a conical tool.

A machine tool that carries out the chamfer machining method including each piece of the above-describe processing includes a main shaft that grips a workpiece, a tool spindle to which a conical tool is mounted, and a control unit configured to control the rotation of the main shaft and the tool spindle. The height of the conical tool and the position of the rotation axis of the conical tool are controlled by the control unit.

INDUSTRIAL APPLICABILITY

It is possible to apply the present invention to a machine tool that carries out the chamfer machining on an opening edge part of a cross hole formed on a workpiece.

CITATION LIST

1 conical tool
2-1 and 2-2 cross hole
3 convex arc-shaped part
4 concave arc-shaped part
11-1 and 11-2 cutting blade
21-1, 21-2, 21-3 and 21-4 opening edge part
W workpiece

The invention claimed is:
1. A chamfer machining method for carrying out chamfer machining of an opening edge part of a cross hole formed on a workpiece having an outer peripheral surface that has a cross-sectional shape of a circle or an inner peripheral part that has a cross-sectional shape of a circle, by rotating a tool having a conical cutting blade,
   wherein chamfer machining is carried out so that a surface having the same width is formed on the opening edge part of the cross hole by controlling at least one of a height of the tool and a position of a rotation axis of the tool, based on the shape of the opening edge part of the cross hole and a conic section that is generated by cutting the cutting blade by a virtual plane that is tangent to the circle, of the outer peripheral surface or the inner peripheral part, at a point which is a machining point on which the tool machines the cross hole, so that the conic section comes into contact with an inner wall of the cross hole at one point.
2. The chamfer machining method according to claim 1 wherein
   at least one of the height of the tool and the position of the rotation axis of the tool is controlled based on the degree measure of a vertex angle of the conical shape of the cutting blade of the tool and an inner diameter of the cross hole.

* * * * *